(12) United States Patent
Charlton

(10) Patent No.: US 12,486,377 B2
(45) Date of Patent: Dec. 2, 2025

(54) BUILDING MATERIAL

(71) Applicant: Wildcard IP Holdings, LLC, Alpharetta, GA (US)

(72) Inventor: Joel T. Charlton, Alpharetta, GA (US)

( * ) Notice: Subject to any disclaimer, the term of this patent is extended or adjusted under 35 U.S.C. 154(b) by 399 days.

(21) Appl. No.: 17/959,492

(22) Filed: Oct. 4, 2022

(65) Prior Publication Data

US 2024/0110037 A1    Apr. 4, 2024

(51) Int. Cl.
| | |
|---|---|
| *C08K 3/26* | (2006.01) |
| *C08J 5/04* | (2006.01) |
| *C08K 7/14* | (2006.01) |

(52) U.S. Cl.
CPC ............... *C08K 3/26* (2013.01); *C08J 5/043* (2013.01); *C08K 7/14* (2013.01); *C08J 2375/06* (2013.01); *C08J 2375/08* (2013.01); *C08K 2003/265* (2013.01); *C08K 2201/003* (2013.01); *C08K 2201/014* (2013.01)

(58) Field of Classification Search
CPC ...... C08K 3/26; C08K 7/14; C08K 2003/265; C08K 2201/003; C08K 2201/014; C08J 5/043; C08J 2375/06; C08J 2375/08
See application file for complete search history.

(56) References Cited

U.S. PATENT DOCUMENTS

| | | |
|---|---|---|
| 3,236,895 A | 2/1966 | Lee et al. |
| 4,661,533 A | 4/1987 | Stobby |
| 5,369,147 A | 11/1994 | Mushovic |
| 5,424,014 A | 6/1995 | Glorioso et al. |
| 5,508,315 A | 4/1996 | Mushovic |
| 5,604,266 A | 2/1997 | Mushovic |
| 5,723,506 A | 3/1998 | Glorioso et al. |
| 6,916,863 B2 | 7/2005 | Hemmings et al. |
| 7,241,818 B2 | 7/2007 | Hemmings et al. |
| 7,473,722 B2 | 1/2009 | Guiselin et al. |
| 7,879,144 B2 | 2/2011 | Hemmings et al. |
| 8,088,840 B2 | 1/2012 | Guiselin et al. |
| 8,453,390 B2 | 6/2013 | Letts et al. |
| 8,629,199 B2 | 1/2014 | Guiselin et al. |
| 8,846,776 B2 | 9/2014 | Herrington et al. |
| 9,315,612 B2 | 4/2016 | Shutov |
| 9,481,759 B2 | 11/2016 | Herrington et al. |
| 9,512,288 B2 | 12/2016 | Brown |
| 9,650,466 B2 | 5/2017 | Shutov |
| 9,932,457 B2 | 4/2018 | Hill et al. |
| 9,988,512 B2 | 6/2018 | Crocco et al. |
| 10,030,126 B2 | 7/2018 | Kumar et al. |
| 10,472,281 B2 | 11/2019 | Kumar et al. |
| 2018/0319942 A1* | 11/2018 | Kumar ............... C08G 18/6622 |
| 2022/0145147 A1* | 5/2022 | Krishnan ............. C08K 5/5435 |

FOREIGN PATENT DOCUMENTS

CN    102660014 A   *   9/2012

OTHER PUBLICATIONS

Shao, CN102660014-MT (Year: 2012).*
CertainTeed Safety Data Sheet, CT SDS ID No. CT10180, https://www.certainteed.com/resources/SPG_ICON_SDS.pdf, Jul. 18, 2014, pp. 1-11.
Boral Composites Inc. Safety Data Sheet, Synthetic Composite Building Trim, Siding and Moulding Products, https://ruexterior.com/wp-content/uploads/2018/10/truexterior_SDS.pdf, May 29, 2015, pp. 1-5.

* cited by examiner

*Primary Examiner* — Robert S Jones, Jr.
*Assistant Examiner* — Zhen Liu

(57) ABSTRACT

A building material consists essentially of 65% by weight to 75% by weight calcium carbonate, wherein the calcium carbonate has a particle size distribution having a first mode having a median particle diameter from 10 micrometers to 25 micrometers and a second mode having median particle diameter from 40 micrometers to 80 micrometers; 25% by weight to 35% by weight polyurethane form by reaction of (i) one or more isocyanates selected from the group consisting of diisocyanates, polyisocyanates and mixtures thereof and (ii) one or more polyols, wherein the one or more polyols is free of Mannich polyols; and 2% by weight to 10% by weight glass fiber material.

7 Claims, No Drawings

BUILDING MATERIAL

BACKGROUND

The present disclosure generally relates to a building material, and particularly to a building material comprising a composite of polyurethane, calcium carbonate and glass fiber material.

A polyurethane, fly ash and glass fiber composite building product sold under the brand TRUEXTERIOR, by Westlake Building Products Inc., has grown in popularity as wood replacement product.

Accordingly, a continual need exits for further wood replacement building products.

BRIEF SUMMARY

Disclosed herein are building material comprising a composite of polyurethane, calcium carbonate and glass fiber material.

In one embodiment, a building material consists essentially of 65% by weight to 75% by weight calcium carbonate, wherein the calcium carbonate has a particle size distribution having a first mode having a median particle diameter from 10 micrometers to 25 micrometers and a second mode having median particle diameter from 40 micrometers to 80 micrometers; 25% by weight to 35% by weight polyurethane form by reaction of (i) one or more isocyanates selected from the group consisting of diisocyanates, polyisocyanates and mixtures thereof and (ii) one or more polyols, wherein the one or more polyols is free of Mannich polyols; and 2% by weight to 10% by weight glass fiber material.

In another embodiment, a building material consists essentially of 65% by weight to 75% by weight calcium carbonate, wherein the calcium carbonate has a particle size distribution having a first mode having a median particle diameter from 0.3 micrometers to 1 micrometer, a second mode having a median particle diameter from 10 micrometers to 25 micrometers and a third mode having median particle diameter from 40 micrometers to 80 micrometers; 25% by weight to 35% by weight polyurethane form by reaction of (i) one or more isocyanates selected from the group consisting of diisocyanates, polyisocyanates and mixtures thereof and (ii) one or more polyols, wherein the one or more polyols are polyether polyols; 2% by weight to 10% by weight glass fiber material; and wherein the building material has a density of 30 pounds per cubic foot to 50 pounds per cubic foot and has an average flexural stress of at least 1600 psi.

The above described and other features are exemplified by the following drawing and detailed description.

DETAILED DESCRIPTION

Disclosed herein are building material comprising a composite of polyurethane, calcium carbonate and glass fiber material.

Isocyanates suitable for use in the composite described herein include one or more monomeric or oligomeric poly- or di-isocyanates. The monomeric or oligomeric poly- or di-isocyanate include aromatic diisocyanates and polyisocyanates. The isocyanates can also be blocked isocyanates or pre-polymer isocyanates. An example of a useful diisocyanate is methylene diphenyl diisocyanate (MDI). Useful MDI's include MDI monomers, MDI oligomers, and mixtures thereof.

Further examples of useful isocyanates include those having NCO (i.e., the reactive group of an isocyanate) contents ranging from about 25% to about 35% by weight. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanates; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation under the trademarks MONDUR and DESMODUR. Other examples of suitable isocyanates include MONDUR MR Light (Bayer Corporation), PAPI 27 (Dow Chemical Company), LUPRANATE M20 (BASF Corporation), LUPRANATE M70L (BASF Corporation), RUBINATE M (Huntsman Polyurethanes), and derivatives thereof.

The average functionality of isocyanates useful with the composites described herein can be between about 1.5 to about 5. Further, examples of useful isocyanates include isocyanates with an average functionality of about 2 to about 4.5, about 2.2 to about 4, about 2.4 to about 3.7, about 2.6 to about 3.4, and about 2.8 to about 3.2.

The one or more polyols for use in the composite can include polyester polyols, polyether polyols, or combinations thereof. In some embodiments, the one or more polyols can include 50% or more of one or more highly reactive (i.e., first) polyols. For example, the one or more polyols can include greater than 55%, greater than 60%, greater than 65%, greater than 70%, greater than 75%, greater than 80%, greater than 85%, greater than 90%, greater than 95%, or 100% of one or more highly reactive polyols.

In some embodiments, the one or more highly reactive polyols can include polyols having a hydroxyl number of greater than 250. For example, the hydroxyl number can be greater than 275, greater than 300, greater than 325, greater than 350, greater than 375, greater than 400, greater than 425, greater than 450, greater than 475, greater than 500, greater than 525, greater than 550, greater than 575, greater than 600, greater than 625, greater than 650, greater than 675, greater than 700, greater than 725, or greater than 750.

In some embodiments, the one or more highly reactive polyols can include polyols having a primary hydroxyl number of greater than 250. As used herein, the primary hydroxyl number is defined as the hydroxyl number multiplied by the percentage of primary hydroxyl groups based on the total number of hydroxyl groups in the polyol. For example, the primary hydroxyl number can be greater than 255, greater than 260, greater than 265, greater than 270, greater than 275, greater than 280, greater than 285, greater than 290, or greater than 295.

In some embodiments, the one or more highly reactive polyols include a large number of primary hydroxyl groups (e.g., 75% or more) based on the total number of hydroxyl groups in the polyol. For example, the highly reactive polyols can include 80% or more, 85% or more, 90% or more, 95% or more, or 100% of primary hydroxyl groups. The number of primary hydroxyl groups can be determined using fluorine NMR spectroscopy as described in ASTM D4273, which is hereby incorporated by reference in its entirety.

In some embodiments, the one or more polyols is free of Mannich polyols. Mannich polyols are the condensation product of a substituted or unsubstituted phenol, an alkanolamine, and formaldehyde.

In some embodiments, the one or more first polyols can include an aromatic polyester polyol, an aromatic polyether polyol, or a combination thereof. In some embodiments, the one or more first polyols include an aromatic polyester polyol such as those sold under the TEROL trademark (e.g., TEROL 198).

Examples of highly reactive polyols also include PEL-SOY 744 and PEL-SOY P-750, soybean oil based polyols commercially available from Ele Corporation; AGROL DIAMOND, a soybean oil based polyol commercially available from BioBased Technologies; STEPANOL PD-110 LV and PS 2352, polyols based on soybean oil, diethylene glycol and phthallic anhydride and commercially available from Stepan Company; VORANOL 280, 360 and WR2000, polyether polyols commercially available from Dow Chemical Company; HONEY BEE HB-530, a soybean oil-based polyol commercially available from MCPU Polymer Engineering; JEFFADD B 650, a 65% bio-based content (using ASTM D6866-06) additive based on soybean oil commercially available from Huntsman Polyurethanes; JEFFOL SG 360, a sucrose and glycerin-based polyol commercially available from Huntsman Polyurethanes; and derivatives thereof.

The one or more polyols for use in the composites can include one or more plant-based polyols. In some embodiments, the plant-based polyols are highly reactive polyols. The one or more plant-based polyols useful in the composites can include polyols containing ester groups that are derived from plant-based fats and oils. Accordingly, the one or more plant-based polyols can contain structural elements of fatty acids and fatty alcohols. Starting materials for the plant-based polyols of the polyurethane component can include fats and/or oils of plant-based origin with preferably unsaturated fatty acid residues. The one or more plant-based polyols useful with the composites include, for example, castor oil, coconut oil, corn oil, cottonseed oil, lesquerella oil, linseed oil, olive oil, palm oil, palm kernel oil, peanut oil, sunflower oil, tall oil, and mixtures thereof. In some embodiments, the one or more polyols are non-plant-based polyols.

In some embodiments, the one or more polyols include a less reactive polyol. For example, the composite can be produced from one or more less reactive polyols in addition to one or more highly reactive polyols. Less reactive polyols can have lower hydroxyl numbers, lower numbers of primary hydroxyl groups and/or lower primary hydroxyl numbers than the highly reactive polyols. In some embodiments, the less reactive polyols can have hydroxyl numbers of less than 250, less than 225, less than 200, less than 175, less than 150, less than 125, less than 100, less than 80, less than 60, less than 40, or even less than 20. In some embodiments, the less reactive polyols have about 50% or less primary hydroxyl groups, about 40% or less primary hydroxyl groups, about 30% or less primary hydroxyl groups, about 20% or less primary hydroxyl groups, or even about 10% or less primary hydroxyl groups. In some embodiments, the less reactive polyols can have primary hydroxyl numbers of less than about 220, less than about 200, less than about 180, less than about 160, less than about 140, less than about 120, less than about 100, less than about 80, less than about 60, less than about 40, or even less than about 20. Suitable less reactive polyols include castor oil; STEPANPOL PS-2052A (commercially available from the Stepan Company); AGROL 2.0, 3.6, 4.3, 5.6 and 7.0 (plant-based polyols commercially available from BioBased Technologies); HONEY BEE HB-150 and HB-230, soybean oil-based polyols commercially available from MCPU Polymer Engineering; TEROL 1154, commercially available from Hunstman; MULTRANOL 3900, MULTRANOL 3901, ARCOL11-34, ARCOL 24-32, ARCOL 31-28, ARCOL E-351, ARCOL LHT-42, and ARCOL LHT-112, commercially available from Bayer; and VORANOL 220-028, 220-094, 220-1 ION, 222-056, 232-027, 232-034, and 232-035, commercially available from Dow.

The one or more polyol can include 50% or less of one or more less reactive polyols in addition to the one or more highly reactive polyols. For example, the one or more polyol can include less than 45%, less than 40%, less than 35%, less than 30%, less than 25%, less than 20%, less than 15%, less than 10%, or less than 5%, of one or more less reactive polyols.

The one or more polyol for use in the disclosure can have an average functionality of 1.5 to 8.0, 1.6 to 6.0, 1.8 to 4.0, 2.5 to 3.5, or 2.6 to 3.1. The average hydroxyl number values (as measured in units of mg KOH/g) for the one or more polyol can be from about 100 to 600, 150 to 550, 200 to 500, 250 to 440, 300 to 415, and 340 to 400.

The composites can include more than one type of polyol. The one or more polyols can be combined in various percentages, e.g., 15-40% of a less reactive polyol and 60-85% of a highly reactive polyol.

The polyurethane systems used to form the composite materials described herein can include one or more additional isocyanate-reactive monomers in addition to the one or more polyol. The one or more additional isocyanate-reactive monomers can include, for example, amine and optionally hydroxyl groups.

In some embodiments, the one or more additional isocyanate-reactive monomers can include a polyamine. The first isocyanate-reactive monomer can comprise a polyamine. Any suitable polyamine can be used. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey. Exemplary polyoxyalkylene diamines are commercially available, for example, from Huntsman Corporation under the trade names JEFFAMINE D-230, JEFFAMINE D-400 and JEFFAMINE D-2000. Exemplary polyoxyalkylene triamines are commercially available, for example, from Huntsman Corporation under the trade names JEFFAMINE T-403, JEFFAMINE T-3000, and JEFFAMINE T-5000.

In some embodiments, the additional isocyanate-reactive monomer can include an alkanolamine. The alkanolamine can be a dialkanolamine, a trialkanolamine, or a combination thereof. Suitable dialkanolamines include dialkanolamines which include two hydroxy-substituted $C_1$-$C_2$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted C.sub.1-C.sub.12 alkyl groups (e.g., three hydroxy-substituted C.sub.1-C.sub.8 alkyl groups, or three hydroxy-substituted C.sub.1-C.sub.6 alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis(2-hydroxypropyl)-N-(hydroxyethyl)amine (EDIPA), tris(2-hydroxybutyl)amine, hydroxyethyl di(hydroxypropyl)amine, hydroxypropyl di(hydroxyethyl)amine, tri(hydroxypropyl)amine, hydroxyethyl di(hydroxy-n-butyl)amine, hydroxybutyl di(hydroxypropyl)amine, and combinations thereof.

In some embodiments, the additional isocyanate-reactive monomer can comprise an adduct of an alkanolamine described above with an alkylene oxide. The resulting amine-containing polyols can be referred to as alkylene oxide-capped alkanolamines. Alkylene oxide-capped alkanolamines can be formed by reacting a suitable alkanolamine with a desired number of moles of an alkylene oxide. Any suitable alkylene oxide or combination of alkylene oxides can be used to cap the alkanolamine. In some embodiments, the alkylene oxide is selected from the group consisting of ethylene oxide, propylene oxide, butylene oxide, and combinations thereof. Alkylene oxide-capped alkanolamines are known in the art, and include, for example, propylene oxide-capped triethanolamine sold under the trade names CARPOL TEAP-265 and CARPOL TEAP-335 (Carpenter Co.).

In some embodiments, the additional isocyanate-reactive monomer can include an alkoxylated polyamine (i.e., alkylene oxide-capped polyamines) derived from a polyamine and an alkylene oxide. Alkoxylated polyamine can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof.

Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL EDAP-770 (Carpenter Co.) and ethylene and propylene oxide-capped ethylene diamine sold under the trade name CARPOL EDAP-800 (Carpenter Co.).

The additional isocyanate-reactive monomer (when used) can be present in varying amounts relative the one or more polyol used to form the polyurethane. In some embodiments, the additional isocyanate-reactive monomer can be present in an amount of 30% or less, 25% or less, 20% or less, 15% or less, 10% or less, or 5% or less by weight based on the weight of the one or more polyol.

As indicated herein, in the composites, an isocyanate is reacted with a polyol (and any additional isocyanate-reactive monomers) to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. As used herein, an isocyanate may be selected to provide a reduced isocyanate index, which can be reduced without compromising the chemical or mechanical properties of the composite material.

One or more catalysts can be added to facilitate curing and can be used to control the curing time of the polymer matrix. Examples of useful catalysts include amine-containing catalysts (such as DABCO, tetramethylbutanediamine, and diethanolamine) and tin-, mercury-, and bismuth-containing catalysts. In some embodiments, 0.01% to 2% catalyst or catalyst system by weight, based on the weight of the composite (e.g., 0.025% to 1%, 0.05% to 0.5%, or 0.1% to about 0.25%) can be used based on the weight of the composite.

The polyurethane can be present in the composite in amounts from 10% to 60% based on the weight of composite. For example, the polyurethane can be included in an amount from 15% to 60% or 20% to 50% by weight, based on the weight of the composite. In some embodiments, the polyurethane in the composites can be present in an amount of 10% or greater, 15% or greater, 20% or greater, 25% or greater, 30% or greater, 35% or greater, 40% or greater, 45% or greater, 50% or greater, or 55% or greater by weight, based on the weight of composite. In some embodiments, the polyurethane in the composites can be present in an amount of 60% or less, 55% or less, 50% or less, 45% or less, 40% or less, 35% or less, 30% or less, 25% or less, 20% or less, or 15% or less by weight, based on the weight of polymeric composite. In one particular embodiment, the polyurethane is present in an amount from 25% to 35% based on the weight of composite.

The composite includes calcium carbonate. In some embodiments, the particle size distribution of the calcium carbonate can include 50% or greater of calcium carbonate particles by weight having a diameter of from 0.2 micrometers to 100 micrometers. For example, 55% or greater, 60% or greater, 65% or greater, 70% or greater, 75% or greater, 80% or greater, 85% or greater, or 90% or greater of the calcium carbonate particles by weight can have a diameter of from 0.2 micrometers to 100 micrometers. In some embodiments, 50% or greater of the calcium carbonate can have a particle diameter of 100 micrometers or less, 95 micrometers or less, 90 micrometers or less, 85 micrometers or less, 80 micrometers or less, 75 micrometers or less, 70 micrometers or less, 65 micrometers or less, 60 micrometers or less, 55 micrometers or less, 50 micrometers or less, and can have a particle diameter of 0.2 micrometers or more, 0.3 micrometers or more, 0.4 micrometers or more, 0.5 micrometers or more, 0.7 micrometers or more, 1 micrometer or more, 2 micrometers or more, 5 micrometers or more, or 10 micrometers or more. In some embodiments, the 50% or greater of the calcium carbonate can have a particle diameter of from 0.2 micrometers to 100 micrometers, 0.2 micrometers to 90 micrometers, or 0.3 micrometers to 80 micrometers, 1 micrometer to 60 micrometers, or 5 micrometers to 50 micrometers.

In some embodiments, the calcium carbonate can have a particle size distribution with at least three modes. The calcium carbonate particle size distribution can include a first mode having a median particle diameter of 2.0 micrometers or less. In some embodiments, the median particle size of the first mode can be 0.3 micrometers to 1.5 micrometers, 0.4 micrometers to 1 micrometers, or 0.5 micrometers to 0.8 micrometers (e.g., 0.7 micrometers). The calcium carbonate particle size distribution can include a second mode having a median particle diameter of from 3 micrometers to less than 40 micrometers. In some embodiments, the median particle size of the second mode can be from 5 micrometers to 35 micrometers, 10 micrometers to 30 micrometers, or 10 micrometers to 25 micrometers. The calcium carbonate article size distribution can include a third mode having a median particle diameter of 40 micrometers or greater. In some embodiments, the median particle size of the third mode can be from 40 micrometers to less than 100 micrometers, for example from 40 micrometers to 90 micrometers, 40 micrometers to 80 micrometers, or from 40 micrometers to 75 micrometers. In some embodiments, the calcium carbonate particle size distribution can include a first mode having a median particle diameter of from 0.3 micrometers to 1.0 micrometer, a second mode having a median particle diameter of from 10 micrometers to 25 micrometers, and a third mode having a median particle diameter of from 40 micrometers to 80 micrometers. In some embodiments, the calcium carbonate can also include an additional ultrafine mode with a median particle diameter of from 0.05 micrometers to 0.2 micrometers.

In some embodiments, the particle size distribution can include 11-17% of the particles by volume in the first mode, 56-74% of the particles by volume in the second mode, and 12-31% of the particles by volume in the third mode. The ratio of the volume of particles in the second and third modes to the volume of particles in the first mode can be from 4.5 to 7.5.

The calcium carbonate can be present in the composites in amounts from 20% to 90% by weight. In some embodiments, the calcium carbonate can be present in amounts from 35% to 80% such as from 50% to 80% or from 50% to 75% by weight of the composite. Examples of the amount of calcium carbonate present in the composites described herein include 20%, 25%, 30%, 31%, 32%, 33%, 34%, 35%, 36%, 37%, 38%, 39% 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% by weight. In one particular embodiment, the calcium carbonate is present in an amount of 65% to 75% by weight of the composite.

In some embodiments, a fiber material can be included in the composite, e.g., to provide increased strength, stiffness or toughness. The fiber material can be any natural or synthetic fiber material, based on inorganic materials, organic materials, or combinations of both. Fiber materials suitable for use with the composite described herein can be present in the form of individual fibers, fabrics, rovings, or tows. Exemplary fiber materials that can be used in the composite include mineral wool fibers such as stone wool, slag wool, or ceramic fiber wool. The mineral wool fibers can be synthetic or can be obtained from molten mineral such as lava, rock or stone. Other suitable inorganic fiber materials include basalt fibers, alumina silica fibers, aluminum oxide fibers, silica fibers, carbon fibers, metal fibers, and combinations thereof. Exemplary organic fiber materials that can be used in the composite include hemp fibers, sisal fibers, cotton fibers, straw, reeds, or other grasses, jute, bagasse fibers, abaca fibers, flax, southern pine fibers, wood fibers, cellulose, saw dust, wood shavings, lint, vicose, leather fibers, rayon, and mixtures thereof. Other suitable organic fiber materials include synthetic fibers such as, KEVLAR, viscose fibers, polyamide fibers, polyacrylonitrile fibers, DRALON fibers, polyethylene fibers, polypropylene fibers, polyvinyl alcohol fibers, polyacrylic fibers, polyester fibers, aramid fibers, carbon fibers, or combinations thereof. In some embodiments, the composites can include a combination of fibers that break and fibers that do not break when the composite is fractured by external stress.

The fiber material can be present in the composites in amounts from 0.5% to 20% by weight, based on the weight of polyurethane composite. For example, the fiber material can be present in amounts from 1% to 20%, 1% to 10%, 1.5% to 8%, 2% to 6%, or 2% to 4% by weight, based on the weight of the composite. In one embodiment, the fiber material is present in an amount of 2% to 10% by weight.

In some embodiments, the composites can comprise a plurality of glass fibers as the fiber material. Glass fibers can include fibrous glass such as E-glass, C-glass, S-glass, and AR-glass fibers. In some embodiments, fire resistant or retardant glass fibers can be included to impart fire resistance or retarding properties to the composites. The glass fibers can be from 1 millimeter to 50 millimeters in average length. In some embodiments, the glass fibers are from 1.5 millimeters to 30 millimeters, from 2 millimeters to 30 millimeters, from 3 millimeters to 30 millimeters, or from 3 millimeters to 15 millimeters in average length. In some embodiments, the average length of the glass fibers in the composites can be 1 millimeter or greater, 1.5 millimeters or greater, 2 millimeters or greater, 3 millimeters or greater, 4 millimeters or greater, 5 millimeters or greater, or 6 millimeters or greater. In some embodiments, the average length of the glass fibers can be 50 millimeters or less, 40 millimeters or less, 30 millimeters or less, 20 millimeters or less, 15 millimeters or less, 12 millimeters or less, or 10 millimeters or less. The glass fibers in the composites can have any dimension of from 1 micrometer to 30 micrometers in average diameter. For example, the average diameter of the glass fibers can be 1.5 micrometers to 30.micrometers, 3 micrometers to 20 micrometers, 4 micrometers to 18 micrometers, or 5 micrometers to 15 micrometers in average diameter. The glass fibers can be provided in a random orientation or can be axially oriented.

Methods of preparing the composites are described herein. The composites can be formed by the reaction of one or more isocyanate, selected from the group consisting of diisocyanates, polyisocyanates, and mixtures thereof, and one or more polyol, in the presence of calcium carbonate, and a fiber material and optionally a catalyst. In some embodiments, the composite can be produced by mixing the one or more isocyanates, the one or more polyols, calcium carbonate, in a mixing apparatus such as a high speed mixer or an extruder. In some embodiments, mixing can be conducted in an extruder.

The mixture can then be extruded into a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. A molded article can then be formed followed by removal of the article from the mold.

The flexural strength of the composites described herein can be 300 pounds per square inch (psi) or greater. For example, the flexural strength of the polyurethane composites can be 500 psi or greater, 700 psi or greater, 900 psi or greater, 1000 psi or greater, 1100 psi or greater, 1200 psi or greater, 1300 psi or greater, 1400 psi or greater, 1500 psi or greater, or 1600 psi or greater. The flexural strength can be determined by the load required to fracture a rectangular prism loaded in the three point bend test as described in ASTM C1185-08 (2012).

The optimization of various properties, such as density and flexural strength, of the composite allows their use in building materials and other structural applications. For example, the composites can be formed into shaped articles and used in building materials include siding and trim materials, roofing materials such as roof tiles, architectural moldings, sheets, decking materials, synthetic lumber, sound barrier/insulation, thermal barriers, fencing materials, marine lumber, and other shaped articles.

Advantageously, embodiments disclosed herein include calcium carbonate. Compared to fly ash, calcium carbonate has less impurities, specifically carbon. Carbon can interfere with reaction chemistry, for example creating variations in tack free times. U.S. Pat. No. 9,932,457 discloses the use of Mannich polyols in making polyurethane and fly ash composites to limit variations in tack free time. By using calcium carbonate, the need for using Mannich polyols is eliminated. As such, in one embodiment, the composite is made not using Mannich polyols (e.g., the one or more polyols is free of Mannich polyols). By not using Mannich polyols, the cost of manufacturing the building material can be reduced when compared to using lower cost polyols. Moreover, with calcium carbonate having less impurities, production scrap may be reduced compared to composites utilizing fly ash as a filler in the composite again due to the variability of impurities in the fly ash.

The building materials and methods of the appended claims are not limited in scope by the specific composites and methods described herein, which are intended as illustrations of a few aspects of the claims and any composites, materials, and methods that are functionally equivalent are intended to fall within the scope of the claims. Various modifications of the composites, materials and methods in addition to those shown and described herein are intended to fall within the scope of the appended claims. Further, while only certain representative composites, materials, and method steps disclosed herein are specifically described, other combinations of the composite materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially" of and "consisting of" can be used in place of "comprising" and "including" to provide for more specific embodiments of the invention and are also disclosed.

What is claimed is:

1. A building material consisting essentially of:
   65% by weight to 75% by weight calcium carbonate, the calcium carbonate has a particle size distribution having a first mode having a median particle diameter from 0.3 micrometers to 1.5 micrometers, a second mode having median particle diameter from 5 micrometers to 35 micrometers, and a third mode having a median particle diameter from 40 microns to 80 microns, wherein the particle size distribution by volume for the calcium carbonate includes 11% to 17% for the first mode, 56% to 74% for the second mode, and 12% to 31% for the third mode;
   25% by weight to 35% by weight polyurethane form by reaction of (i) one or more isocyanates selected from the group consisting of diisocyanates, polyisocyanates and mixtures thereof and (ii) one or more polyols, wherein the one or more polyols is free of Mannich polyols; and
   2% by weight to 10% by weight glass fiber material.

2. The building material of claim 1, wherein the calcium carbon has a fourth mode having a median particle diameter from 0.05 micrometers to 0.2 micrometers.

3. The building material of claim 1, the building material has a density of 30 pounds per cubic foot to 50 pounds per cubic foot.

4. The building material of claim 1, the building material has an average flexural stress of at least 1600 psi.

5. The building material of claim 1, wherein the one or more polyols are polyether polyols.

6. The building material of claim 1, wherein the one or more polyols are polyester polyols.

7. A building material consisting essentially of:
   65% by weight to 75% by weight calcium carbonate, wherein the calcium carbonate has a particle size distribution having a first mode having a median particle diameter from 0.3 micrometers to 1 micrometer, a second mode having a median particle diameter from 10 micrometers to 25 micrometers and a third mode having median particle diameter from 40 micrometers to 80 micrometers, wherein the particle size distribution by volume for the calcium carbonate includes 11% to 17% for the first mode, 56% to 74% for the second mode, and 12% to 31% for the third mode;
   25% by weight to 35% by weight polyurethane form by reaction of (i) one or more isocyanates selected from the group consisting of diisocyanates, polyisocyanates and mixtures thereof and (ii) one or more polyols, wherein the one or more polyols are polyether polyols;
   2% by weight to 10% by weight glass fiber material; and
   wherein the building material has a density of 30 pounds per cubic foot to 50 pounds per cubic foot and has an average flexural stress of at least 1600 psi.

* * * * *